(12) United States Patent
Kouloumbis

(10) Patent No.: US 6,755,972 B1
(45) Date of Patent: Jun. 29, 2004

(54) BIOLOGICAL PURIFICATION OF WATER TO ANY DEGREE UP TO AND DRINKING WATER

(76) Inventor: Panagiotis Kouloumbis, 12 Gadsden Flats, 97 Johannesburg Rd., Lyndhurst, Johann (ZA), 2192

( * ) Notice: Subject to any disclaimer, the term of this patent is extended or adjusted under 35 U.S.C. 154(b) by 0 days.

(21) Appl. No.: 09/700,711
(22) PCT Filed: Jan. 20, 1999
(86) PCT No.: PCT/GR99/00007
§ 371 (c)(1),
(2), (4) Date: Feb. 16, 2001
(87) PCT Pub. No.: WO99/61379
PCT Pub. Date: Dec. 2, 1999

(30) Foreign Application Priority Data

May 26, 1998 (GR) .......................................... 980100184

(51) Int. Cl.[7] ................................................ C02F 3/00
(52) U.S. Cl. ........................ 210/602; 210/605; 210/622
(58) Field of Search ................................ 210/602, 605, 210/617, 622

(56) References Cited

U.S. PATENT DOCUMENTS 4,415,450 A 11/1983 Wolverton 5,106,504 A 4/1992 Murray

FOREIGN PATENT DOCUMENTS

EP 0409367 1/1991

*Primary Examiner*—Chester T. Barry
(74) *Attorney, Agent, or Firm*—Dowell & Dowell, P.C.

(57) ABSTRACT

An installation and a method for water purification which includes sequentially: A first section where the waters enter the installation and where the incoming waters come into contact with living microscopical and macroscopical organisms in order to achieve the removal from the waters, as sludge, water contents in suspension, whether such contents existed in the incoming waters or whether such contents were produced after the incoming waters entered the works and they came in contact with living organisms. A second section comprising a series of structures like structure which are connected so that each one drains its water into a following one, while each structure of the type of structure contains a layer of inert material into which grow suitable plants which utilize for their growth contents within the incoming waters so that such contents are removed from the flowing waters. The total area of the series of structures like structure is determined from the desired degree of purity of the outgoing waters, for a particular quality of incoming water.

11 Claims, 2 Drawing Sheets

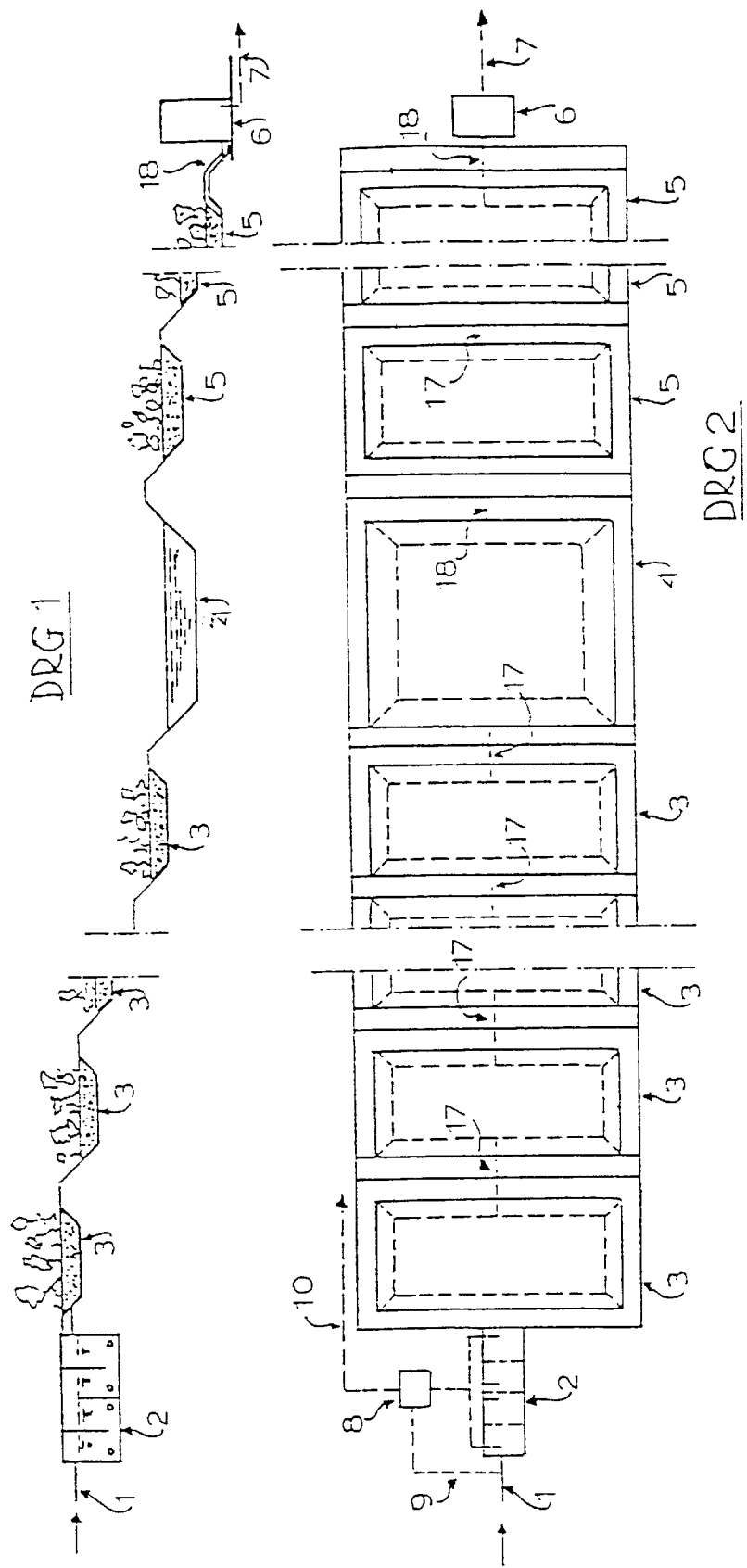

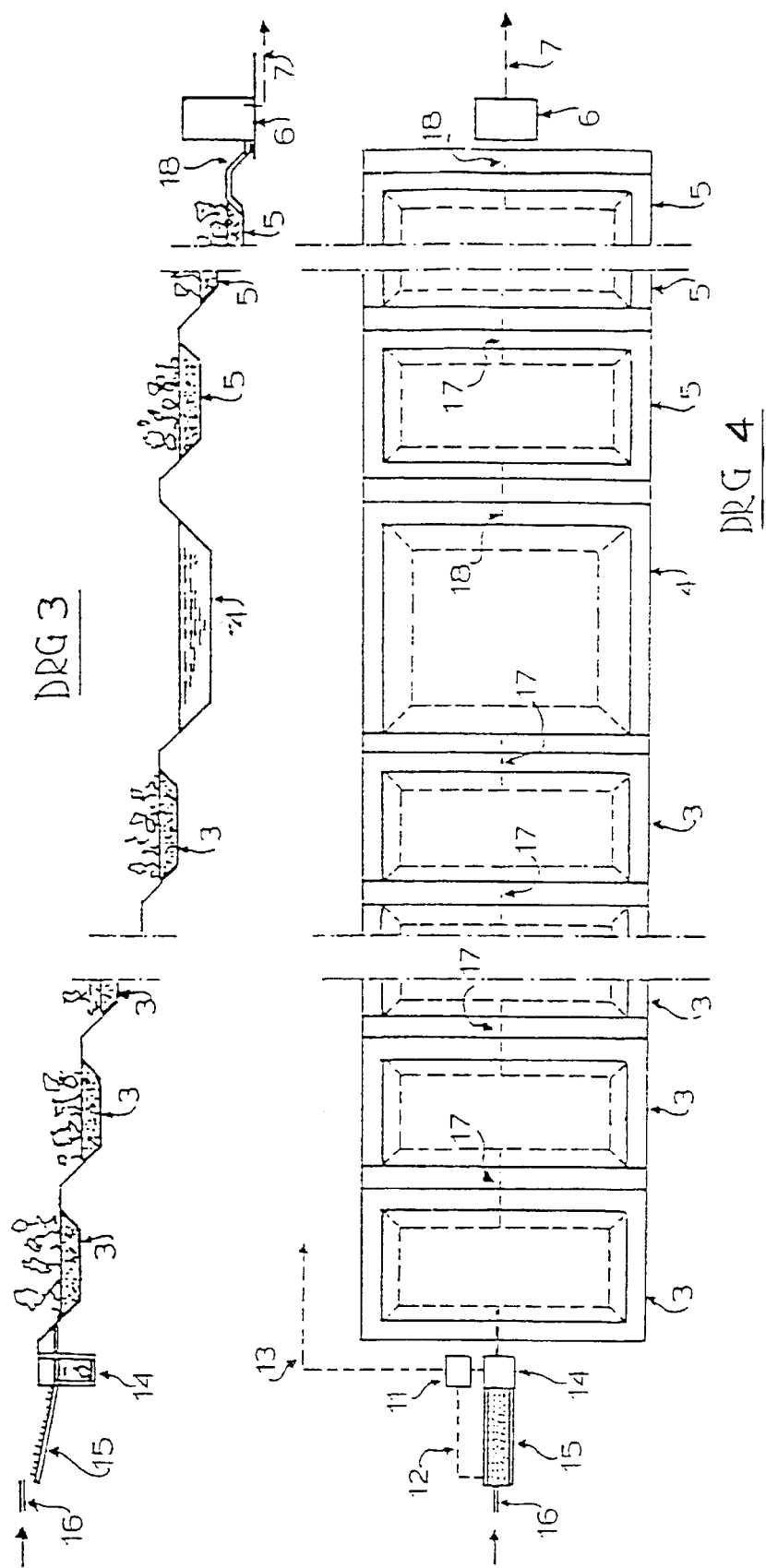

BIOLOGICAL PURIFICATION OF WATER TO ANY DEGREE UP TO AND DRINKING WATER

DESCRIPTION

Waters are presently purified for two main purposes:

"A" river waters are purified to become potable waters, and

"B" sewage waters are purified sufficiently to become acceptable for discharge into rivers.

There are many other cases, e.g. river waters needed to be purified to a degree to be used by a particular industry. All such various cases, too numerous to mention, are considered rather sub cases of the above general "A" and "B" categories. Effluents of industries which are not liable to biological purification are not subject to the proposed installations.

In cases "A", as above, the purification of waters is done by employing physical and chemical methods using costly concrete structures, while in the cases "B", as above, the purification of waters is also done using costly concrete structures but by employing biological methods in conjunction with physical-chemical methods.

The proposed installations introduce a considerable deviation from the above "A" and "B" methods. It aims to transform the purification of waters to predominately agricultural methods with the result to abolish the great majority of the costly concrete structures.

Plant roots supply the plants with plant nutrients which are of great variety but predominately phosphates and nitrates. Certainly the plants in addition to plant nutrients they absorb water and carbon dioxide. Therefore in the body of the herbivorous animals we shall find chemical combinations which were derived from plants plus oxygen and water. Now in the body of the flesh-eating animals, such as man, we shall find chemical combinations which had been derived from oxygen, water and from what was originally in the body of the herbivorous animals.

Water impurities from inhabited areas are generated mainly from human bodies (water-closets, sinks, baths etc.) with the result that sewage contains nitrogenous and phosphoric chemical combinations which originated from plant nutrients. Such impurities are broken down and consumed as their food by micro-organisms. It is proposed to create an environment whereby the growth of plants is assisted. The plants would be harvested and taken away from the system as fast as the impurities enter such a system.

Drawing one is a vertical section and drawing two a plan of a system where the hereby proposals are embodied. Such system is a combination of achieved knowledge with new structures unknown up to now.

Number 1 indicates the water entry into the system and pipe 7 directs the outflowing potable water into a water reticulation system. Within structure 2 the impurities are broken down, mainly in the absence of atmospheric air, where the sludge settles onto the bottom. Pump station 8 does two jobs, re-circulates the water from the last compartment into the first compartment of structure 2 and also takes the sludge from the bottom of structure 2 and pumps it through pipe 10 to the area of compost production. Structure 2 is not known up to now.

Structures 3, 4, and 5 are not known up to now. They are earth structures which are covered with impervious membranes. Such membranes might be replaced with other means of impervious materials e.g. a layer of concrete. Structures 3 and 5 are filled with broken stones. Here vegetation is planted with the roots growing within the voids of the stones. Any type of plants such as seasonal vegetables or animal feeds, such as clover, may be grown. It is preferable to plant a new crop as soon as the vegetation in a structure is harvested. Fish is produced in structure 4. If the final destination of the water is to be discharged into the river then structures 5 and 6 are not needed with the exception of disinfection, say chlorination, if this is so desired. If higher degree of water purification is needed then structures 5 and 6 are needed.

In structure 6 are employed known processes of water purification. There e.g. membranes, micro filtration or other processes are to be seen and after disinfection e.g. chlorination, the water would be directed to the drinking water reticulation system.

Pipe 10 leads the sludge in the area of compost production. Their alternative layers of vegetation and sludge are piled one over the other to convenient heights of perhaps, an orthogonal shape on plan. There organisms brake down substances developing high temperatures which kill pathogenic organisms. The final product is compost of high quality. In order to keep the external surface of the heaps in high temperature, such heaps are covered with a layer of already produced compost which has already been freed from pathogenic organisms. The production of compost from sludge is already known. Nevertheless, in the present purification works this is not included as a rule. The sludge which contains great numbers of pathogens, is simply at present dried up and is taken by farmers who sometimes, allow it to come in contact with vegetables which might have their crops even below the ground surface.

The danger to public, dysentery, etc., is considerable. This can be avoided if the production of compost is part of the process of purification as proposed herewith.

In drawings 3 and 4 structure 2 is omitted and structures 15 and 14 are put in its place. Here structure 15 provides a sloping surface, not known up to now, where the water descends towards structure 14. The sludge settles within structure 14. It is taken by pump station 11 and transported through pipe 13 to the area where, as in the case on drawings 1 and 2, compost is to be produced. The second job done by pump station 11 is to take the water from structure 14, from a level above the sludge, and pump it upstream of the sloping surface of structure 14. As the sloping surface has protrusions the passage of the water along the sloping surface is uneven with the result that the water comes in contact with more atmospheric air, than otherwise, and thus the purification of the water is enhanced.

Drawings 1 and 2 on the one hand and drawings 3 and 4 on the other describe two identical groups of structures, which are identical except in one respect. They only differ where the water enters the systems. Structure 2 is different to structures 14 and 15.

When the water is destined to be discharged into the river structure 4 needs to be of rather a moderate size. Its purpose is to prove that the water to be discharged into the river is not deleterious to fish life. If, however, the water is to become potable it has to come in contact to a much greater extent with the sun, the atmospheric air and in general with the fauna and flora of rivers It is common knowledge that vegetation can improve the quality of waters after such waters come in contact with the vegetation, e.g. reeds in marches etc.

Unfortunately such knowledge has not influenced very much the construction of water purification works. At the contrary, the proposed system is to harvest continually masses of vegetation which are removed from the system as fast as nitrogenous and phosphoric plant nutrients are entering the works.

As there is the cycle of rain which falls on the ground, finds its way towards the sea, it is transformed into vapours, clouds and again rain, so there is the cycle of the plant nutrients. Vegetation absorbs nutrients, water and carbon dioxide. The herbivorous animals eat the vegetation which is converted to flesh. The flesh-eating animals such as man, introduce into their bodies what was earlier plant nutrients, plus water and atmospheric oxygen. And so used water from human bodies is not surprising to contain combinations which also include what was originally plant nutrients.

In order to complete the cycle we must apply methods to remove such plant nutrients with the best way, which is of course to put the plants to do the job. At the contrary, we apply physical—chemical methods at present to remove such plant nutrients not surprising to a high cost. The proposed method of water purification lets the plants do the job. If we want to produce eggs shall we endeavour to build expensive manufacturing laboratories to produce synthetic eggs or we shall rather let the chicken do the job? This method proposes to free communities form the burden of highly expensive methods of water purification.

This proposed method is to earn income a matter not mentioned as yet. If an irrigation farmer is offered free irrigation and free fertilization for his crops is he going to become much richer than he was before? Similarly the owner of the proposed purification system is to prosper financially.

There are four compartments in structure 2.

The impurities are consumed there by the micro-organisms with the result the quantities of the impurities are reduced from compartment to compartment while at the same time the micro-organisms are multiplied. The number of compartments may be less than four or larger than four. This is to be left to the discretion of the designer.

Structure 4 may be similar in extent as the other structures or, at the contrary, it may be a pond, or a lake, which could offer entertainment to local inhabitants. The latter is an advantage in the case when drinking water is to be produced. This is obvious if we note that sewage from a town can be purified by a river if the sewage runs many kilometers along the river without having new impurities added to the water. The proposed method of biological purification does the same work as the river but in a shorter distance because it concentrates great masses of organisms in such short distance.

The types of plants to grow in the system is almost unlimited. Plants which produce greater masses per square meter are of advantage as they remove greater quantities of plant nutrients per unit area. The plants absorb through their roots plant nutrients which contain nitrogen and phosphorus to far greater extend than other elements. These other elements are always present in the sewage of a town. The plants chosen to grow may be food for animals or man. It is advisable to prefer plants which give fruits above ground level so that the fruits do not come in contact with the water and thus endanger man or animals.

If it is felt that there is no safety for men and/or animals grattings may be placed on the top of the broken stones to isolate the water. In many of the present biological systems there is no official control as to how the dried up sludge is used by the farmers who removed it from the biological works.

So such sludges, which may contain great numbers of pathogenic organisms, may come in contact with, say, carrots, or beetroots which are to be consumed by man. Chemical and biological analysis in the future of samples of vegetables produced within the proposed works, compared with samples of the same type of vegetables from the produce markets, are expected to prove that the vegetables from the proposed works are not more dangerous to man than the ordinary vegetables from the present produce markets. It is expected they will rather be less dangerous. The contact of the roots with faecal coli-forms is to be hostile to the latter. It is suggested to prove this through relative analysis.

Though manure form a variety of animals such as sheep, horses or cattle differ, nevertheless, all of them are valuable natural fertilizers. Why should be assumed, without investigation, that human excrement cannot be a valuable fertilizer. Authorities, such as official laboratories etc should of course investigate, from chemical and medical point of view, the proposed works and compare them with the existing ones. It would not be surprising to find the proposed works less dangerous and this for two reasons. First the roots of the vegetation would be hostile to pathogens and secondly the produced compost would prove safer as compared to present sludge handling.

What is claimed is:

1. An installation for the biological purification of urban waste water including:

waste water entrance duct means;

a first sludge settlement section for receiving the urban waste water and braking down impurities in suspension and consumption of said impurities by living microscopic and macroscopic organisms;

a pump station adapted to perform firstly a recirculation of a portion of the waste water contained within said first sludge settlement section, said pump station being positioned close to an outlet end of said first sludge settlement section for recirculating the portion of the waste water back to a point upstream of said first sludge settlement section where said portion of waste water is mixed with waste water being conveyed to said first sludge settlement section, said pump station also transferring sludge formed within said first sludge settlement section to a compost production area;

a plurality of earthen structures each filled with a layer of inert material, said earthen structures being connected in series so that water passing therethrough passes to an immediately adjacent one of said earthen structures downstream thereof, wherein the water flowing through said plurality of earthen structures is purified due to removal therefrom of nutrient contents by action of roots of vegetation planted within each of said earthen structures and which vegetation grows within voids in said layers of inert material, and purified water exit duct means for receiving purified water from said plurality of earthen structures and, wherein a desired degree of purity of the urban waster water, for a given quality of incoming urban waster water is used to determine a total area of said plurality of earthen structures.

2. The installation for the biological purification of urban waste water according to claim 1 further including an additional earthen structure for receiving water outgoing from said plurality of earthen structures wherein the water is further purified, said additional earth structure being selectively adapted to function as a pond or lake for production of fish and entertainment to local inhabitants, a size of said additional earthen structure varying from a first size if a destination of water discharged therefrom is a flowing body of water to a larger size if a destination of water discharged therefrom is to be potable.

3. The installation for the biological purification of urban waste water according to claim 2, further including:

an additional plurality of earthen structures downstream said additional earthen structure, wherein each of said additional plurality of earthen structures is filled with a layer of inert material and said additional plurality of earthen structures being connected so that each one drains water passing therethrough to an immediately adjacent one of said additional earthen structures downstream thereof, wherein water flowing through said additional plurality of earthen structures is purified due to removal therefrom of nutrient contents by action of roots of vegetation planted within said additional plurality of earthen structures growing within voids in said layers of inert material, and a structure receiving water outgoing from said additional plurality of earthen structures for effecting a disinfection treatment thereof prior to the purified water passing to said exit duct means.

4. The installation for the biological purification of urban waste water according to claim 1, wherein said first sludge settlement section includes a septic structure having a plurality of sequential compartments, anaerobic organisms developing within said septic structure and giving rise to anaerobic reactions.

5. The installation for the biological purification of urban waste water according to claim 1, wherein said first sludge settlement section includes an inclined surface that is uneven with protrusions so as to retard waste water flow therefrom and enhance its exposure to atmospheric air, to thereby promote development of aerobic organisms that give rise to aerobic reactions, and a sludge settlement structure located downstream of said inclined surface, said pump station recirculating said portion of waste water to a point upstream of said inclined surface.

6. A method for the biological purification of urban waste water including the steps of:

conveying incoming waste water into an installation for the biological purification thereof;

settling sludge within a first section of the installation by braking down impurities in suspension and consumption of said impurities by living microscopic and macroscopic organisms, recirculating of a portion of waste water contained within said first section and close to an outlet end thereof back to a point upstream of said first section wherein said portion of waste water is mixed with incoming waste water;

transferring sludge being formed within said first section to a compost production area;

feeding water from said first sludge settlement section into a plurality of earthen structures aligned in series and each filled with a layer of inert material and connected so that each one of said earth structures drains water passing therethrough to an immediately adjacent one of said earthen structures downstream thereof, wherein water flowing through said plurality of earthen structures is purified due to removal therefrom of nutrient contents by roots of vegetation planted within said plurality of earthen structures and growing within voids in said layers of inert material, and discharging purified water downstream a last one of said plurality of earthen structures, wherein a degree of purity for a particular quality of incoming waste water is determined by a total area of said plurality of earthen structures.

7. The method for the biological purification of urban waste water according to the above claim 6, wherein an enhanced purification of waste water is obtained including the additional steps of:

feeding of water from said plurality of earth structures into an additional earthen structure which is selectively adapted to operate as a pond or a lake for production of fish and entertainment to local inhabitants, the water being further purified within said additional earthen structure, and a size of said additional earthen structure varying from a first size if a destination of water discharged therefrom is a flowing body of water to a larger size if destination of water discharged therefrom is to be potable;

feeding of water outlet from said additional earthen structure into an additional plurality of earthen structures, wherein each of said additional plurality of earthen structures is filled with a layer of inert material and connected so that each one of said additional plurality of earthen structures drains water passing therethrough to an immediately adjacent one of said additional plurality of earthen structures downstream thereof, and wherein water flowing through said additional plurality of earthen structures is purified due to removal therefrom of nutrient contents by roots of vegetation planted within said additional earthen structures and growing within voids in said layers of inert material, and feeding water outgoing from said additional plurality of earthen structures into a structure wherein disinfection treatment thereof is effected prior to said purified water being discharge.

8. The method for the biological purification of urban waste water according to the above claim 6, wherein said portion of waste water contained within said first section of sludge settlement which is recirculated from a point close to the outlet end thereof and mixed with incoming waste water back at a point upstream of said first section is a multiple quantity of the quantity of the incoming waste water.

9. The method for the biological purification of urban waste water according to the above claim 6, wherein said portion of waste water contained within said first section of sludge settlement which is recirculated from a point close to the outlet end thereof and mixed with incoming waste water at a point upstream of said first section enters the incoming waster water at distance upstream of said first section sufficient to reduce possible offensive odors.

10. The method for the biological purification of urban waste water according to the above claim 6, wherein transfer of the sludge being formed within said first section to a compost production area is produced by piling alternative layers of vegetation and sludge to form a heap of predetermined height and shape, covering the heap with a layer of produced compost to maintain a high temperature of an external surface thereof, and allowing living organisms contained within the sludge to break down substances and effect disinfection by the development of high temperatures generated therefrom, so as to kill pathogenic organisms and provide compost of high hygienic quality.

11. The method for the biological purification of urban waste water according to the above claim 6, wherein said vegetation planted within said plurality of earthen structures includes plants for consumption by humans or animals.

* * * * *